(12) United States Patent
Bernardi et al.

(10) Patent No.: US 8,326,993 B2
(45) Date of Patent: Dec. 4, 2012

(54) TECHNIQUES FOR MANAGING TERMINAL SERVICES SESSIONS

(75) Inventors: Ara Bernardi, Mercer Island, WA (US); John E. Parsons, Jr., Sammamish, WA (US); Mahesh Sharad Lotlikar, Sammamish, WA (US); Ritu Bahl, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 1891 days.

(21) Appl. No.: 11/119,407

(22) Filed: Apr. 29, 2005

(65) Prior Publication Data

US 2006/0248180 A1   Nov. 2, 2006

(51) Int. Cl.
*G06F 15/16* (2006.01)
(52) U.S. Cl. ..................................... 709/227
(58) Field of Classification Search ............... 709/227
See application file for complete search history.

(56) References Cited

U.S. PATENT DOCUMENTS

| | | | |
|---|---|---|---|
| 6,189,146 B1 * | 2/2001 | Misra et al. | 717/177 |
| 6,824,045 B2 * | 11/2004 | Yap et al. | 235/375 |
| 6,826,571 B1 | 11/2004 | Baer et al. | |
| 7,103,662 B2 * | 9/2006 | Ray et al. | 709/225 |
| 2002/0032763 A1 * | 3/2002 | Cox et al. | 709/223 |
| 2002/0184398 A1 | 12/2002 | Orenshteyn | |
| 2002/0194010 A1 * | 12/2002 | Bergler et al. | 705/1 |
| 2004/0031058 A1 * | 2/2004 | Reisman | 725/112 |
| 2004/0105431 A1 | 6/2004 | Monjas-Llorente et al. | |
| 2004/0181578 A1 | 9/2004 | Elms | |
| 2004/0230970 A1 | 11/2004 | Janzen | |
| 2004/0250130 A1 * | 12/2004 | Billharz et al. | 713/201 |
| 2005/0021613 A1 | 1/2005 | Schmeidler et al. | |
| 2005/0021756 A1 | 1/2005 | Grant | |
| 2005/0183143 A1 * | 8/2005 | Anderholm et al. | 726/22 |

FOREIGN PATENT DOCUMENTS

WO   WO03060718   7/2003
WO   WO2004088543   10/2004

OTHER PUBLICATIONS

Microsoft Exchange 2000 Server Resource Kit, Microsoft Press, 2000. pp. 1-11.*
TELNET. http://web.archive.org/web/20040702155919/http://home.att.net/~gbruen/net/telnet.htm. 2004. pp. 1-3.*
Hines, Bill et al., "IBM WebSphere Session Management," informit.com, Prentice Hall PTR, Aug. 27, 2004, http://www.informit.com/articles/article.asp?p=332851&seqNum=4, 14 pages, printed Jul. 13, 2005.
FutureSoft, Inc. "Session Manager," website at http://www.futuresoft.com/support/scriptxmp/sx-sesman.htm, copyright 1997-2005, printed Jul. 13, 2005.
TextMaestro Technologies 2003, "Session Manager," http://www.textmaestro.com/InfoTech_06_SessMan.htm, 3 pages, printed Jul. 13, 2005.
McAfee, "Session Manager Debug Port Privilege Escalation Vulnerability," http://www.mcafeesecurity.com/uk/security/resources/sv_ent10.htm, 1 page, copyright 2005 Networks Associates Technology, Inc., printed Jul. 13, 2005.

* cited by examiner

*Primary Examiner* — John Macilwinen
(74) *Attorney, Agent, or Firm* — Lee & Hayes, PLLC

(57) ABSTRACT

Techniques relating to managing terminal services scenarios are described. In one instance, a process establishes a new terminal services session having a session configuration consistent with a permitted terminal services session configuration. The process also monitors whether the new terminal services session configuration remains consistent with the permitted terminal services session configuration.

20 Claims, 6 Drawing Sheets

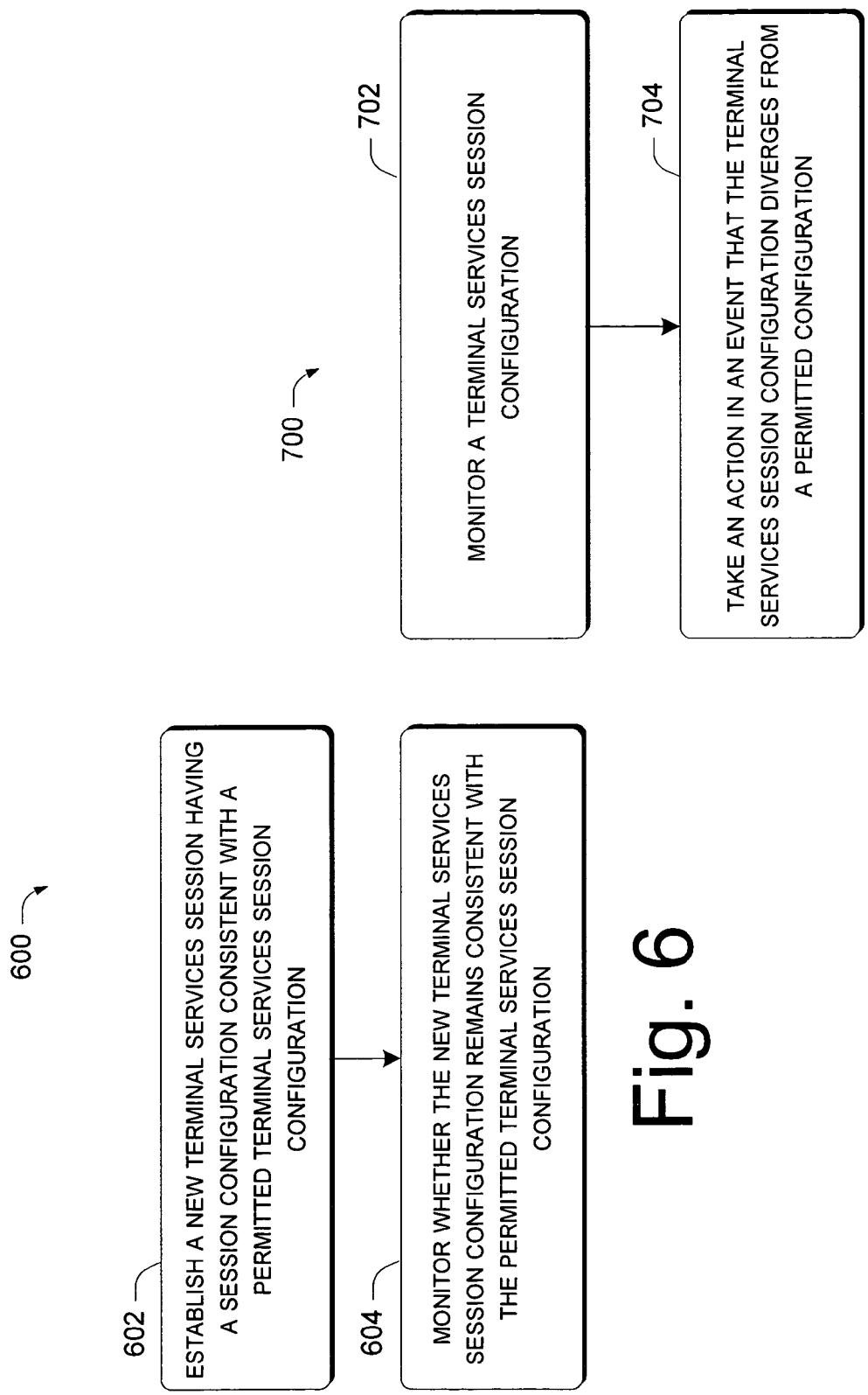

TECHNIQUES FOR MANAGING TERMINAL SERVICES SESSIONS

TECHNICAL FIELD

In general, the present invention relates to computer software and communication networks, and in particular, to techniques for managing terminal services sessions.

BACKGROUND

Terminal Services provides a terminal services session between a client computer and a server computer. The terminal services session can enable the client computer to connect over a network to the server computer to generate a remote desktop on the client computer. In a remote desktop scenario, one or more applications run on the server computer and remote just their 'output' (i.e. graphics or user-interface) to the client computer over the network. Generally, processing conducted by the applications is carried out on the server prior to sending the output to the client computer. Capabilities for managing various terminal services session scenarios are desired.

SUMMARY

The techniques described below relate to managing terminal services scenarios. In one instance, a process establishes a new terminal services session having a session configuration consistent with a permitted terminal services session configuration. The process also monitors whether the new terminal services session configuration remains consistent with the permitted terminal services session configuration.

In another instance, a process monitors a terminal services session configuration. The process takes an action in an event that the terminal services session configuration diverges from a permitted configuration.

BRIEF DESCRIPTION OF THE DRAWINGS

FIGS. 6-7 illustrate flow diagram for managing terminal services sessions in accordance with one implementation.

DETAILED DESCRIPTION

Overview

The techniques described below relate to managing terminal services sessions, such as by enforcing parameters for individual terminal services sessions.

Figure 1:
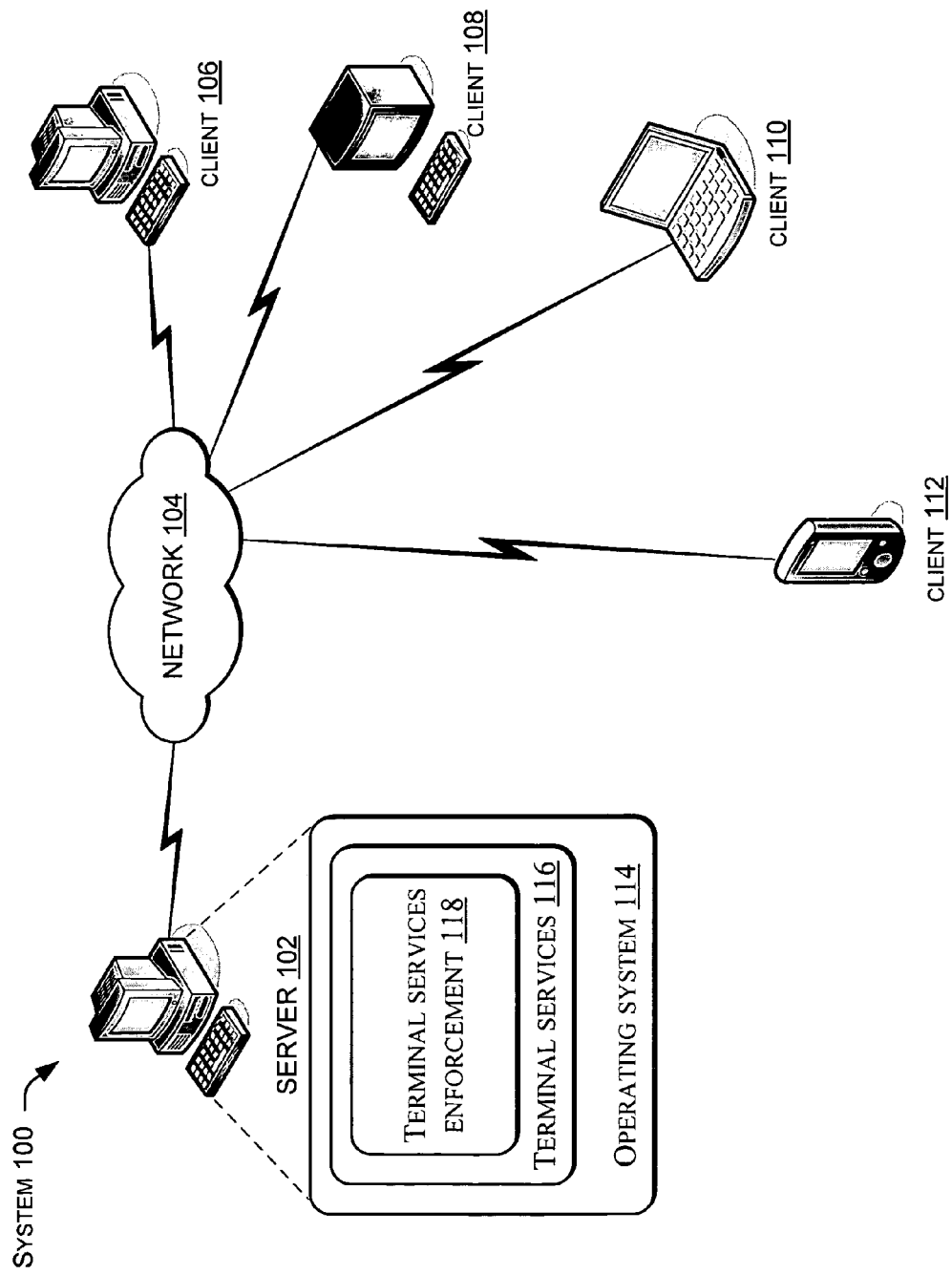
FIG. 1 illustrates an exemplary system for managing terminal services sessions in accordance with one implementation.

For purposes of explanation consider FIG. 1 which illustrates a system 100. The system includes a server 102 coupled to one or more clients via a network 104. In this instance, four clients 106, 108, 110 and 112 are connected to network 104. Server 102 includes an operating system 114, a terminal services component 116, and a terminal services enforcement component 118. Though not specifically designated, the clients may be any combination of local and/or remote clients. For instance, clients 106 and 108 may be connected to server 102 via a local area network, while clients 110 and 112 may be coupled to a wide area network such as the internet.

Terminal services component 116 operating cooperatively with operating system 114 enables a terminal services session between server 102 and a client, such as client 106. The terminal services session allows a desktop generated at server 102 to be remotely displayed at the client 106 as a 'remote desktop'. Generally described, processing occurs at the server with the client receiving only a representation, such as a bit map, from the server which is displayed as the remote desktop.

Terminal services sessions are broadly categorized into two types of sessions. A first session type is a rich terminal services session and second session type is a limited terminal services session. Rich terminal services sessions allow a user of a remote client to access a majority of the functionality available on the server. For instance, any word processing applications, spreadsheet applications, and file browser applications, which are available on the server would be available for the client.

Limited terminal services sessions allow a sub-set of the server's functionality to be accessed from the client. For instance, in the above example where the server has a word processing application, spreadsheet application, and file browser application, the client may be allowed to utilize a single application, such as the word processing application, while being prohibited from utilizing the remaining applications.

Server 102 may include authorization or permission for one or more concurrent terminal services sessions of one or more session types. The authorization parameters can relate to numbers of each session type permitted and to parameters relative to sessions of a given type, among others. For instance, the server may be permitted or licensed to allow two rich sessions and two limited sessions. So, for example, assume that two rich sessions and two limited sessions are currently running. If the terminal services enforcement component detects a request for a third session of either type, the terminal services enforcement component will deny the requested session.

The limited sessions are subject to further parameters which are enforced by the terminal services enforcement component. For instance, a limited session may be authorized to access only a single application on the server. The terminal services enforcement component 118 ensures that the individual session only accesses the authorized application. The terminal services enforcement component is further configured to terminate the session if the session deviates from the authorized parameters.

The implementations described above and below are described in the context of a computing environment as commonly encountered at the present point in time. Various examples can be implemented by computer-executable instructions or code means, such as program modules, that are executed by a computer, such as a personal computer or PC. Generally, program modules include routines, programs, objects, components, data structures and the like that perform particular tasks or implement particular abstract data types.

Various examples may be implemented in computer system configurations other than a PC. For example, various implementations may be realized in hand-held devices, multiprocessor systems, microprocessor-based or programmable consumer electronics, network PCs, minicomputers, mainframe computers, cell phones and the like. Further, as technology continues to evolve, various implementations may be realized on yet to be identified classes of devices. For example, as the cost of a unit of processing power continues to drop and wireless technologies expand, computing devices resembling today's cell phones may perform the functionalities of today's PC, video camera, cell phone, and more in a single mobile device. This single device may in one scenario act as a server and in another scenario act as a client. This is but one of many existing and developing examples for the described implementations.

The terms server and client, as used herein, do not connotate any relative capabilities of the two devices. The client may have more, less, or equal processing capabilities than the server. Rather, in this document, the names server and client describe the relative relationship of the two components. For example, a computing experience of a first or server device is remoted to a second or client device.

Although the various implementations may be incorporated into many types of operating environments as suggested above, a description of but one exemplary environment appears in FIG. 5 in the context of an exemplary general-purpose computing device and which is described in more detail later in this document under the heading "Exemplary Operating Environment".

Exemplary Implementations and Processes

Figure 2:
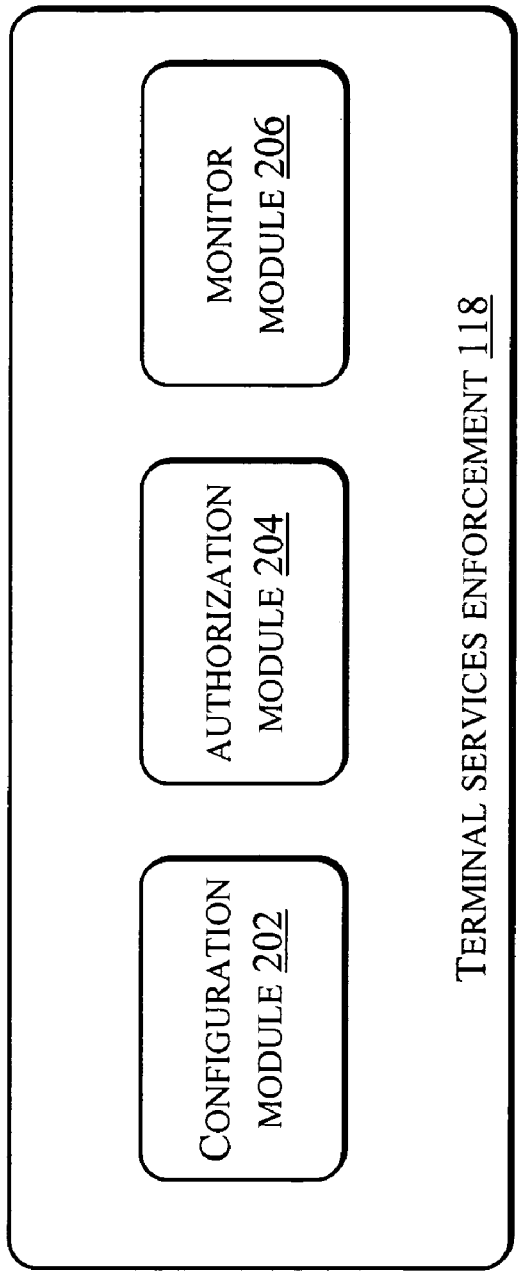
FIG. 2 illustrates portions of an exemplary system for managing terminal services sessions in accordance with one implementation.

FIG. 2 illustrates a more detailed view of the terminal services enforcement component 118 described above in relation to FIG. 1. In this implementation, the terminal services enforcement component includes a configuration module 202, an authorization module 204, and a monitor module 206. The configuration module 202 is configured to detect a client's request for a terminal services session. The configuration module is also configured to determine what type of terminal services session is being requested by the client. For instance, is the client requesting a rich terminal services session or a limited terminal services session? Further, in instances where the configuration module determines that the client is requesting a limited terminal services session, the configuration module may be further configured to determine more details of the requested configuration. For example, the client may want a limited terminal services session with access to two applications on the server.

Authorization module 204 is configured to compare the requested type of terminal services session to any permitted or licensed terminal services sessions. A list of permitted terminal services sessions and their respective parameters may be maintained and compared to the requested terminal services session. For instance, a particular server may be permitted to allow one rich terminal services session and one limited terminal services session at any given time. Assume for purposes of example, that in this instance a condition or parameter exists for the permitted limited terminal services session that only the word processing application will be accessible. If the requested terminal services session corresponds to conditions of the permitted session, then the authorization module is configured to cause the requested terminal services session to be enabled. So in this instance, assume that the requested terminal services session is for a limited terminal services session including access to the word processing application. The authorization module 204 is configured to enable the requested terminal services session since the requested terminal services session satisfies the conditions associated with the authorized or permitted limited terminal services session.

The monitor module 206 is configured to monitor current terminal services sessions to ensure that individual terminal services sessions remain consistent with their authorization conditions or parameters. Continuing the above example, the monitor module 206 is configured to monitor the enabled limited terminal services session. The monitor module compares the authorization parameters to the actual configuration of the terminal services session. If at any time the actual configuration diverges from the authorized configuration and/or otherwise attempts to diverge from the authorized configuration, then the monitor module terminates the terminal services session.

For instance, assume that the above mentioned limited terminal services session begins to run both the word processing application and a spreadsheet application on the server. The monitor module is configured to detect the deviance from the authorized configuration which allows access only to the word processing application rather than the current configuration accessing both the word processing application and the spreadsheet application. Responsive to detecting this deviation, the monitor module 206 is configured to terminate the terminal services session. This is but one example of the properties and/or restrictions which the monitor module can be configured to monitor in relation to individual terminal services sessions.

Some implementations enhance reliability of the monitor module by first ensuring that the monitor module is properly launched and is authentic at launch and second by periodically checking that the monitor module is functioning properly. For instance, at start-up, the terminal services enforcement component checks the validity of the monitor module. Such a technique reduces an opportunity for an unauthorized person to alter or otherwise manipulate the monitor module. Upon start-up, the monitor module is configured to begin reporting to the terminal services enforcement component such as by pinging or sending what is sometimes referred to as a 'heartbeat' to indicate that the monitor module is properly functioning. To further reduce unauthorized manipulation of the monitor module and/or the terminal services session, the terminal services enforcement component terminates the associated session if the monitor module fails to ping as intended. For ease of explanation, the monitor module is illustrated here as a single distinct functional component. In some other configurations, the functionality of the monitor module can be collectively accomplished by a plurality of components. These components may operate within, external to, or some combination thereof in relation to the terminal services enforcement component. For instance, in one configuration a first monitoring component may operate external to the terminal services enforcement component and communicate to a second monitoring component which is internal to, or is a sub-unit of the terminal services enforcement component 118A. The skilled artisan should recognize various configurations consistent with the concepts described above and below.

Figure 3:
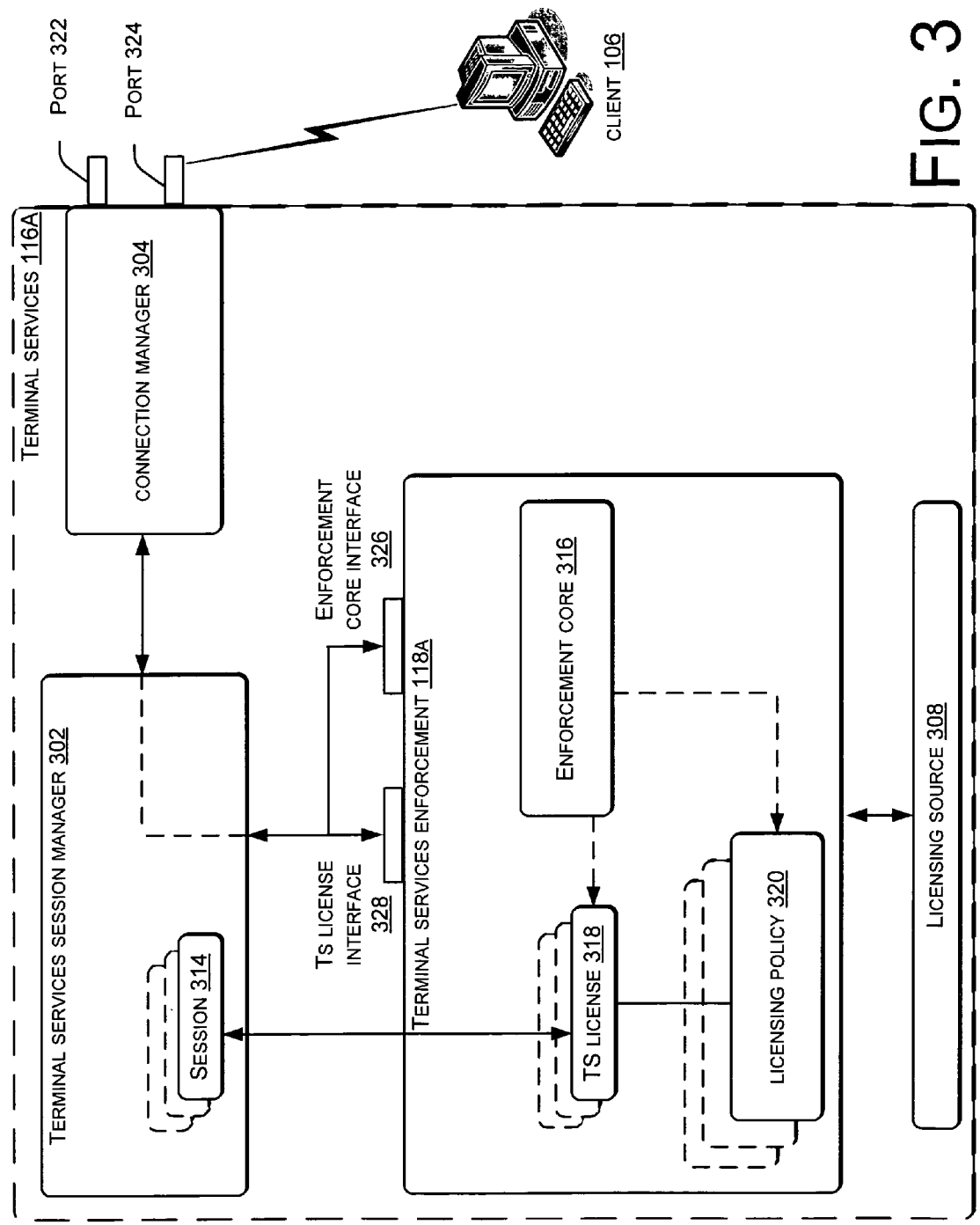
FIG. 3 illustrates portions of an exemplary system for managing terminal services sessions in accordance with one implementation.

FIG. 3 illustrates a terminal services architecture configured to manage terminal services sessions in accordance with one implementation. In this instance, terminal services component 116A includes a local or terminal services session manager 302, a connection manager 304, a terminal services enforcement component 118A, and a licensing source 308. Terminal services session manager 302 launches a session 314. Terminal services enforcement component 118A includes an enforcement core 316, a TS license object 318, and a licensing policy object 320.

Connection manager 304 is configured to listen for, or otherwise detect, an incoming connection, such as from client 106. In this illustrated configuration, the connection manager is coupled to two distinct port types. A first type port 322 is configured for rich terminal services sessions, while a second type port 324 is configured for limited terminal services sessions. In such a configuration, the port upon which an incoming connection is received can be indicative of the type of requested new terminal services session. So for instance in the illustrated configuration, client 106 is connecting to port 324. As such the connection manager 304 can determine that client 106 is requesting a new limited terminal services session. Other configurations may utilize only a single port type such that connection manager 304 utilizes other means to determine a type of new terminal services session being requested for the incoming connection. For instance, the connection manager may ask the client what type of new terminal services session is being requested.

The connection manager 304 is configured to communicate the existence of the incoming connection to the terminal services session manager 302. The terminal services session manager 302 is configured to establish a corresponding session(s) 314 for the requested new session. For instance, the terminal services session manager may call a kernel level session manager (not specifically designated) to create the session. The terminal services session manager also is configured to call the terminal services enforcement component 118A responsive to session 314.

The terminal services enforcement component 118A is configured to ensure that session 314 is consistent with parameters of a permitted or licensed session scenario, examples of which are described above and below. Responsive to a new session request, the terminal services enforcement component is configured to create a new terminal services (TS) license object 318 and to create a new licensing policy object 320. The terminal services enforcement component 118A also is configured to maintain a list of licensing policy objects which are already loaded.

In this instance, the licensing source 308 acts a secure data holder containing data relating to the types of permitted terminal services sessions, the number of each type of permitted session and any conditions or parameters imposed upon individual sessions. Session parameters may come in many forms, ranging from a number of allowed sessions of a particular session type, to what applications are permitted to run in limited type sessions. For purposes of explanation, consider by way of analogy that the licensing source holds permission slips for permitted terminal services sessions. Individual permission slips may contain parameters associated with a permitted or licensed terminal services session. So for instance, in a given scenario, the licensing source may have any number of permission slips for rich sessions and/or any number of permission slips for limited sessions. Further, individual permission slips relating to limited sessions may have associated parameters which are the same or different than the parameters of other limited session permission slips.

At least some implementations maintain licensing source 308, or a similar functionality, as a module which is independent of the terminal services enforcement component 118A. Such a configuration is but one technique for allowing the authorized terminal services session parameters to be adapted for various system configurations and or updated without altering the terminal services enforcement component. Such a configuration also may contribute to a higher level of security than is realized when the licensing source in contained within the terminal services enforcement component 118A.

The licensing policy object 320 reviews the data or permission slips contained in the licensing source 308 and determines if an appropriate permission slip is available for session 314. For instance, assume that the licensing source contains five permission slips for limited sessions. Further assume in this instance that all of the limited sessions have the same parameters. The licensing policy object 320 determines if any of the limited session permission slips are available. For example, if the new session is the first limited session and the licensing source has permission slips for five limited sessions then the licensing policy object should determine that a permission slip is available for the requested new session 314. Conversely, if the requested new session is the sixth limited session and the licensing source only allows five limited sessions, then the licensing policy component determines that the new session should be denied.

The TS license object 318 is associated with an individual session, in this instance new session 314. The TS license object contains authorization or permission parameter(s) associated with session 314. The TS license object functions as a container for license data and licensing policy and is associated with individual sessions. For instance, if a permission slip is available for session 314, the permission slip is obtained and stored in the associated TS license object 318. The permission slip acts as the license authorizing session 314. TS license object 318 once associated with session 314, subscribes to any notifications, such as logon and logoff, for that session. Based on these notifications, the license object 318 invokes appropriate policy methods to manage the session licenses.

Enforcement core 316 compares session 314 and its associated parameters stored in TS license object 318 to the permission slip data obtained by the licensing policy component 320. If the TS license object 318 complies with the conditions of the licensing policy component 320, then the enforcement core 316 allows session 314. If the TS license 318 does not comply with any of the available permission slips then the enforcement core 316 disallows the session 314.

For purposes of explanation consider the following example. Assume that terminal services 116A is operating in cooperation with licensing source 308 which contains licenses for two rich sessions and two limited sessions. Further assume that the limited sessions only allow the user to access a word processing application and prohibit access to other applications on the server. In the above described configuration, the terminal services session licenses are contained in the licensing source 308. Assume that a first incoming connection is detected by the connection manager on port 310. The connection manager 304 recognizes the incoming connection as a request for a rich terminal services session and communicates this information to the terminal services manager 302 which creates a corresponding session 314. The information regarding the requested session configuration is further communicated to the terminal services enforcement component 118A via the enforcement core interface 326. Enforcement core 316 instantiates terminal services license object 318 corresponding to the requested session configuration, which in this instance is for a rich session. The enforcement core also generates licensing policy 320 which access the data contained in licensing source 308. In this instance, licensing source 308 indicates that a rich session permission slip is available. As such, when the enforcement core 316 compares the requested session configuration of the terminal services license object 318 to the authorized conditions of the licensing policy component 320, the enforcement core finds that the requested session is permitted and so the enforcement core allows session 314 to be maintained. Information regarding the session parameters is sent back to the terminal services session manager 302 and/or connection manager 304 via a TS license interface 328. While two distinct interfaces 326 and 328 are utilized in this implementation, other implementations may combine these two interfaces into a single interface.

Terminal services enforcement component 118A may utilize various security protocols to ensure that the licensing parameters utilized for session authorization and/or monitoring purposes are authentic. For instance, the parameters may be obtained and authenticated by the terminal services enforcement component prior to start-up of terminal services. For instance, some implementations may require an application to be signed when the product is installed. Further, some of these implementations require the signature to be validated prior to startup. After session startup, the terminal services enforcement component 118A continues monitoring which applications are currently running within a restricted session. The terminal services enforcement component terminates the session in case of any compromise, or deviation from the authorized parameters.

In summary, the terminal services enforcement component 118A reads relevant information for defining a requested new session, be it a limited session or a rich session. Through the cooperative behavior of the terminal services enforcement component 118A, terminal services session manager 302 and an instance of connection manager 304, new terminal services sessions are compared to authorized or licensed sessions to determine if the new session should be enabled. For instance, the terminal services enforcement component 118A determines if a licensed or permitted session is available which has parameters consistent with the requested configuration for the new session. If a corresponding permitted session is available, then the new session is enabled. Enabled sessions are monitored to ensure compliance with any parameters associated with the license. The terminal services enforcement component terminates the session if any deviation from the license parameters occurs.

Figure 4:
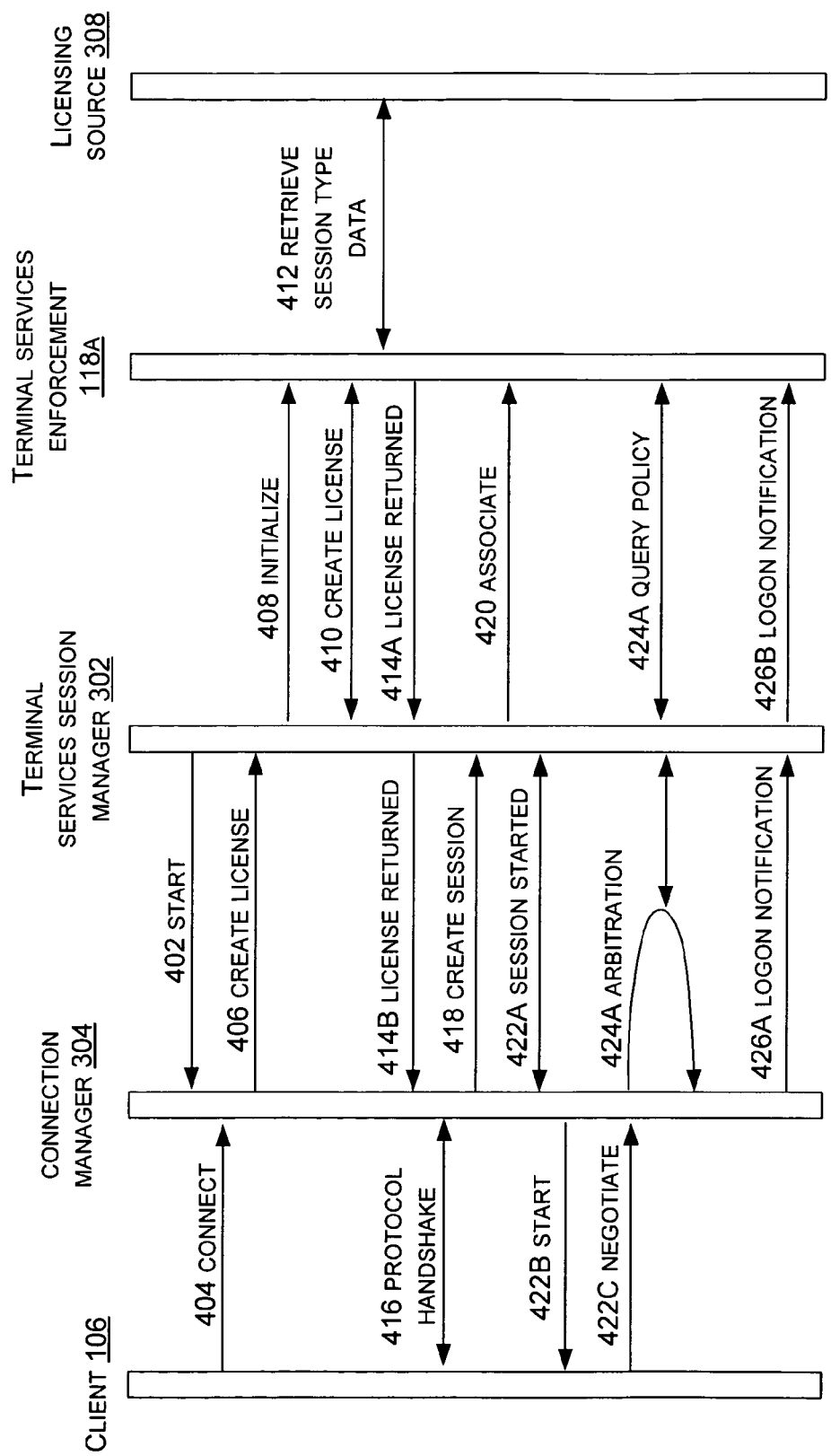
FIG. 4 illustrates a process diagram of one system configuration for managing terminal services sessions in accordance with one implementation.

FIG. 4 illustrates process steps in accordance with one technique for managing terminal services sessions consistent with the terminal services architecture described above in relation to FIG. 3. The order of the process steps described below is different from the order in the examples provided above. Still other implementations may utilize other combinations of components and/or process steps.

At 402, the local or terminal services session manager 302 is started during the system boot. The terminal services session manager 302 determines if a terminal services functionality is available or allowed in the present system configuration. If terminal services is available, then the terminal services session manger starts the connection manager 304. The connection manager 304 starts listening and waits for a connection to a connection port(s). For instance, in the system architecture of FIG. 3, two ports 322 and 324 are utilized.

At 404, a client 106 connects to a port 322 or 324 and is detected by the connection manager 304. The client 106 requests a new session. The connection manager gathers client data including a requested session type of the new session from the client and/or from the port type accessed by the client. The connection manager 304 also may ask the client about the client's licensing capabilities consistent with establishing a protocol handshake at a subsequent point in time.

At 406, the connection manager 304 asks terminal services session manager 302 to create a new TS license for the client's new session. The terminal services session manager relays the request for the license to the terminal services enforcement component 118A.

At 408, the terminal services session manager 302 initializes the terminal services enforcement component 118A if the enforcement component is not already running. In this implementation, processing resources are conserved by not starting terminal services enforcement component 118A on system boot. The terminal services enforcement component 118A is only initialized upon a client's request for a new terminal services session. In this configuration, if the remote connection described above at 404 is the first remote connection after the system is booted, the terminal services enforcement component will not yet be running. In such a case, terminal services session manager 302 loads the terminal services enforcement component 118A and initializes the terminal services enforcement component. During initialization, the enforcement core 316 enumerates all the existing (local) sessions and creates license objects for them. Failure in either loading the terminal services enforcement component or initialization returns an error and the new remote session is denied. This step is skipped in instances where the terminal services enforcement component is already running. This is, of course, but one configuration. For instance, other implementations may launch the terminal services enforcement component upon system boot.

At 410, once the enforcement core 316 is successfully initialized, the terminal services session manager requests that the enforcement core 316 create TS license or TS license object 318 for the session type of the client's requested session.

At 412 the terminal services enforcement component 118A retrieves session type data from the licensing source 308. The terminal services enforcement component 116A queries licensing source 308 about a license packet for the requested session type. The licensing source provides information relating to the restrictions associated with the requested session type and the authorized number of sessions for that session type.

At 414A the terminal services enforcement component 116A returns the license packet from the terminal services enforcement component's TS license 318 to the terminal services session manager 302. At 414B the license object is returned from the terminal services session manager 302 to the connection manager 304. In one such instance, the terminal services enforcement component creates a license packet object which will be utilized during a protocol handshake procedure in subsequent process step 416. The terminal services enforcement component loads licensing policy relative to the requested session type from the licensing source 308. When the license creation is successful, the license packet object is returned to the connection manager 304.

At 416 a protocol handshake is achieved between the connection manager 304 and the client 106. The connection manager receives the license packet object from the TS license 318. The connection manager compares data received from the client to the license packet object received from the TS license 318 and sends a response to the client. The conditions of the session are agreed upon in the protocol handshake which binds the client to the agreed session.

At 418 the connection manager 304 creates a session for the client consistent with the conditions of the protocol handshake. In some instances, the remote client manager creates a terminal for the client's terminal services session and then creates the session. Information regarding the session creation is passed to the terminal services session manager 302.

At 420 the terminal services session manager 302 associates the session with the license object 318 created by the terminal services enforcement component 118A. The terminal services enforcement component then changes a state of the license object to reflect that the license object is associated with the created session. The license object tracks any status changes of the created or new session. For instance, the license object tracks whether the new session disconnects, reconnects, or terminates.

At 422A the new session is started. At 422B the session is started for the client. User credentials, such as user name and password, are requested from the client by a logon/user-authentication functionality of the connection manager. After getting user credentials, the logon/user-authentication functionality asks connection manager 304 what to do with the new session. For instance, if the session is a first session type of which five sessions are authorized and three sessions are available, then the connection manager tells the logon/user-authentication functionality to enable the new session. In a similar scenario if the new session was the sixth session with only five permitted, the connection manager would instruct the logon/user-authentication functionality to deny the new session. Some implementations utilize a binary functionality, e.g. either enable the session or deny the session.

At 422C other implementations may try to negotiate another type of solution. For instance, if the new session would be the sixth session where only five are allowed, the connection manager may try to get an inactive session to voluntarily terminate so that the new session can be enabled.

At 424A implementations which include session negotiation may invoke session arbitration between the connection manager 304 and the terminal services session manager 302. At 424B these implementations may query the licensing policy associated with the session type of the new session from the terminal services enforcement component 118A. A determination is then made whether the new session can be enabled, such as by terminating another session as mentioned above.

At 426A if the new session is allowed, the user is logged-on. Logon notification is sent from the connection manager 304 to the terminal services session manager 302. At 426B Logon notification is sent from the terminal services session manager to the terminal services enforcement component 118A. The terminal services enforcement component's TS license object 318 invokes a licensing policy associated with the new session. A license state of the new session's licensing policy is changed to "License_Active". If the licensing policy does not increment the count, the license state changes to "License_NotUsed". When the session is disconnected, the disconnect method of the licensing policy is invoked. If the licensing policy decrements the count, the license changes state to "License_NotUsed". The process steps described above illustrate but one example for managing a terminal services session. Other configurations may re-arrange and/or eliminate some of the described process steps and/or achieve a managing functionality with different components.

Exemplary System Environment

Figure 5:
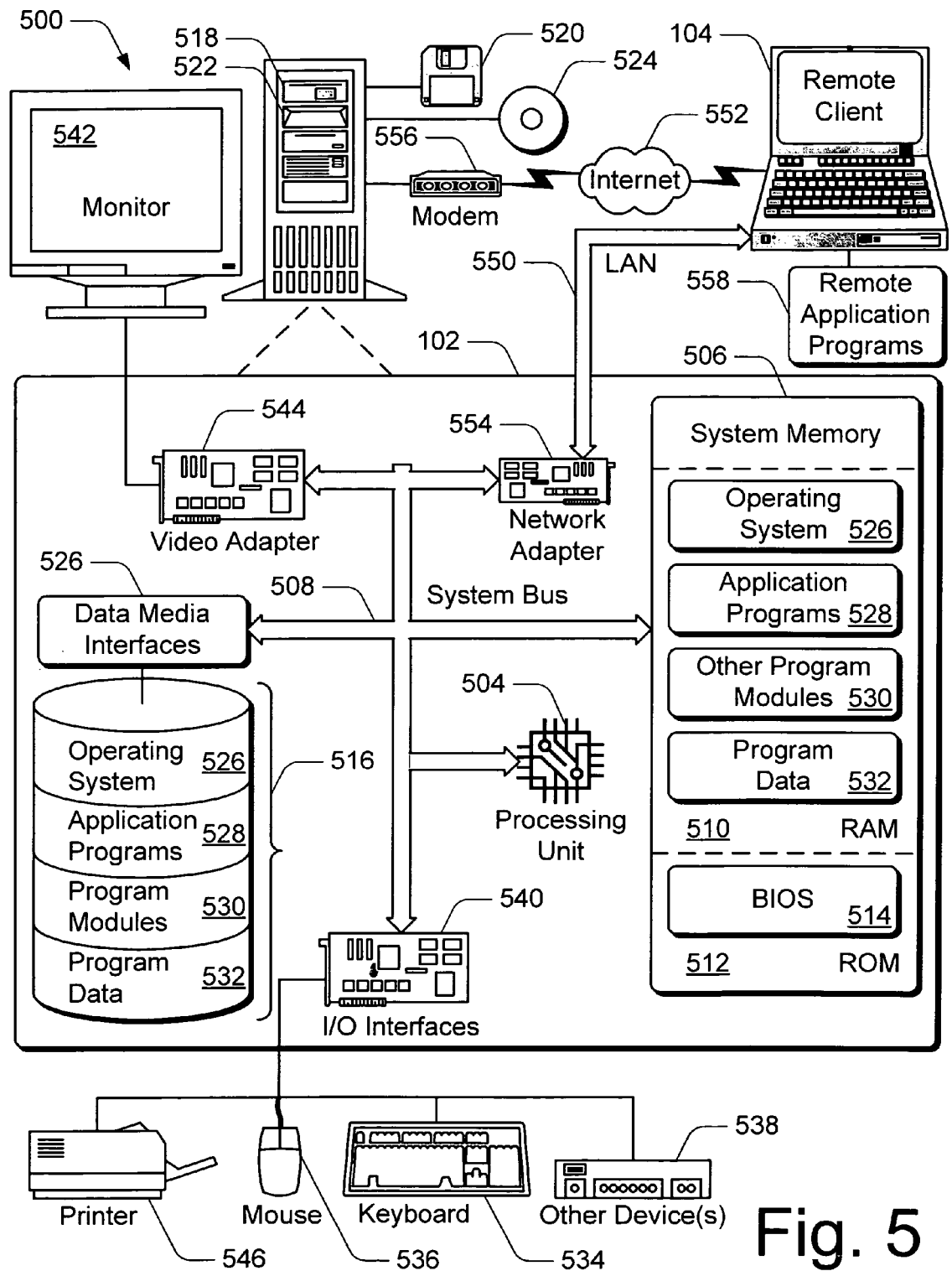
FIG. 5 illustrates exemplary systems, devices, and components in an environment for managing terminal services sessions in accordance with one implementation.

FIG. 5 represents an exemplary system or computing environment 500 for managing terminal services sessions. System environment 500 includes a general-purpose computing system in the form of a server device or server 102. The components of server 102 can include, but are not limited to, one or more processors 504 (e.g., any of microprocessors, controllers, and the like), a system memory 506, and a system bus 508 that couples the various system components. The one or more processors 504 process various computer executable instructions to control the operation of server 102 and to communicate with other electronic and computing devices. The system bus 508 represents any number of several types of bus structures, including a memory bus or memory controller, a peripheral bus, an accelerated graphics port, and a processor or local bus using any of a variety of bus architectures.

Computing environment 500 includes a variety of computer readable media which can be any media that is accessible by server 102 and includes both volatile and non-volatile media, removable and non-removable media. The system memory 506 includes computer-readable media in the form of volatile memory, such as random access memory (RAM) 510, and/or non-volatile memory, such as read only memory (ROM) 512. A basic input/output system (BIOS) 514 maintains the basic routines that facilitate information transfer between components within server 102, such as during start-up, and is stored in ROM 512. RAM 510 typically contains data and/or program modules that are immediately accessible to and/or presently operated on by one or more of the processors 504.

Server 102 may include other removable/non-removable, volatile/non-volatile computer storage media. By way of example, a hard disk drive 516 reads from and writes to a non-removable, non-volatile magnetic media (not shown), a magnetic disk drive 518 reads from and writes to a removable, non-volatile magnetic disk 520 (e.g., a "floppy disk"), and an optical disk drive 522 reads from and/or writes to a removable, non-volatile optical disk 524 such as a CD-ROM, digital versatile disk (DVD), or any other type of optical media. In this example, the hard disk drive 516, magnetic disk drive 518, and optical disk drive 522 are each connected to the system bus 508 by one or more data media interfaces 526. The disk drives and associated computer readable media provide non-volatile storage of computer readable instructions, data structures, program modules, and other data for server 102.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, application programs 528, other program modules 530, and program data 532 (or some combination thereof) may include an embodiment of the systems and methods described herein.

A user can interface with server 102 via any number of different input devices such as a keyboard 534 and pointing device 536 (e.g., a "mouse"). Other input devices 538 (not shown specifically) may include a microphone, joystick, game pad, controller, satellite dish, serial port, scanner, and/or the like. These and other input devices are connected to the processors 504 via input/output interfaces 540 that are coupled to the system bus 508, but may be connected by other interface and bus structures, such as a parallel port, game port, and/or a universal serial bus (USB).

A monitor 542 or other type of display device can be connected to the system bus 508 via an interface, such as a video adapter 544. In addition to the monitor 542, other output peripheral devices can include components such as speakers (not shown) and a printer 546 which can be connected to server 102 via the input/output interfaces 540.

Server 102 can operate in a networked environment using logical connections to one or more remote computers, such as remote client device or client 104. By way of example, the remote client 104 can be a personal computer, portable computer, a server, a router, a network computer, a peer device or other common network node, and the like. The remote client 104 is illustrated as a portable computer that can include many or all of the elements and features described herein relative to server 102.

Logical connections between server 102 and the remote client 104 are depicted as a local area network (LAN) 550 and a general wide area network (WAN) 552. Such networking environments are commonplace in offices, enterprise-wide computer networks, intranets, and the Internet. When implemented in a LAN networking environment, the server 102 is connected to a local network 550 via a network interface or adapter 554. When implemented in a WAN networking environment, the server 102 typically includes a modem 556 or other means for establishing communications over the wide area network 552. The modem 556, which can be internal or external to server 102, can be connected to the system bus 508 via the input/output interfaces 540 or other appropriate mechanisms. The illustrated network connections are exemplary and other means of establishing communication link(s) between the computing devices 502 and 548 can be utilized.

In a networked environment, such as that illustrated with computing environment 500, program modules depicted relative to the server 102, or portions thereof, may be stored in a remote memory storage device. By way of example, remote application programs 558 are maintained with a memory device of remote client 104. For purposes of illustration, application programs and other executable program components, such as the operating system 526, are illustrated herein as discrete blocks, although it is recognized that such programs and components reside at various times in different storage components of the server 102, and are executed by the processors 504 of the server.

Exemplary Processes

FIG. 6 illustrates an exemplary process 600 for managing terminal services sessions. The order in which the process is described is not intended to be construed as a limitation, and any number of the described process blocks can be combined in any order to implement the process. Furthermore, the process can be implemented in any suitable hardware, software, firmware, or combination thereof.

At block 602, the process establishes a new terminal services session having a session configuration consistent with a permitted terminal services session configuration. In one instance the process receives a request for a new terminal services session having a given configuration. The process can obtain types of permitted terminal services sessions and a permitted number of each type. For instance, two types of terminal services session might include rich sessions and limited sessions. Further, for example, two rich sessions may be permitted and two limited sessions may be permitted. For purposes of explanation the permitted sessions may be thought of analogously as permission slips. So for the above example, the process determines that the present configuration allows two rich session permission slips and two limited session permission slips. The limited session permission slips may contain other limitations such as which applications and/or how many applications can be accessed in a limited session.

The process can further ascertain if a permitted session is available. So for instance the process ascertains if all of the permission slips have already been handed out. For instance, where two rich sessions are permitted and two rich sessions have already been allowed then no rich session is available and a requested new rich session will be denied. Some process implementations may take further steps to obtain a permitted session. For instance, if a previously allowed session is inactive, the method may attempt negotiations to have the inactive session voluntarily terminated so that the permitted session is available for the new session. The process then authorizes the new terminal services session if a permitted terminal services session corresponding to the given configuration is available. This process steps described above need not be completed in the order described. For instance, another process implementation may enable a requested new session and then obtain a permitted session corresponding to the new session. If no permitted session can be obtained, then the new session is disabled.

At block 604, the process monitors whether the new terminal services session configuration remains consistent with the permitted terminal services session configuration. For instance, in a situation where the new terminal services session is a limited session, the process may monitor a number and/or identity of applications which are accessible in the session. The accessible applications may be compared to the limitations of the associated permission slip. So for instance, the permission slip may allow only a single application to be accessible during the terminal services session. The process monitors the new terminal services session as to whether the new terminal services session remains consistent with the limitation(s) of the permission slip. Various techniques can be utilized to monitor the session. Examples of which are described above and below.

FIG. 7 illustrates a further exemplary process 700 for managing terminal services sessions.

At block 702, the process monitors a terminal services session configuration. In some implementations, the process monitors what applications are accessible on the terminal services session. Other implementations ascertain how many applications are accessible on the terminal services session. These implementations determine what applications are permitted to be accessed on the terminal services session as per the associated permission slip. The implementations also compare the accessible applications to the permitted applications.

At block 704, the process takes an action in an event that the terminal services session configuration diverges from a permitted configuration. At least some implementations terminate the terminal services session if it diverges from the permitted configuration. Other implementations may take other actions such as attempt to restore the terminal services session configuration to the permitted configuration. These implementations reduce incidences of unauthorized manipulation of a terminal services session and maintain an intended system configuration.

Although implementations relating to managing terminal services sessions have been described in language specific to structural features and/or methods, it is to be understood that the subject of the appended claims is not necessarily limited to the specific features or methods described. Rather, the specific features and methods provide examples of implementations for the concepts described above and below.

The invention claimed is:

1. A method comprising:
   detecting, by a connection manager, an incoming connection from a client to establish a requested terminal services session, the incoming connection requesting one of a plurality of session types for the requested session, the plurality of session types comprising:
   a rich terminal services session allowing the client to access a majority of available functions; and
   a limited terminal services session allowing the client to access a minority of available functions;
   communicating the incoming connection to a session manager to establish a new terminal services session corresponding to the requested terminal services session;
   initializing a terminal services enforcement component, the enforcement component comprising an enforcement core enumerating a plurality of local sessions, the local sessions each having a permitted terminal services configuration according to a licensing policy and a corresponding session configuration according to a corresponding terminal services (TS) license and consistent with the permitted terminal services configuration, the corresponding session configuration related at least in part to the requested session type, wherein the licensing policy and TS license are created by the enforcement core;

binding the client to the new terminal services session according to agreed conditions between the client and the corresponding TS license communicated to the connection manager via the session manager;

establishing the new terminal services session having a session configuration consistent with the corresponding TS license, wherein the session manager associates the corresponding TS license to the new session and the enforcement component changes the state of the TS license to reflect the association; and monitoring whether the session configuration of the new terminal services session remains consistent with the session configuration of the corresponding TS license.

2. A method as recited in claim 1, wherein said establishing further comprises the connection manager:
receiving a user credential responsive to a user-authentication request for a new terminal services session having a given configuration; and,
authorizing the new terminal services session if a permitted terminal services session corresponding to the given configuration is available.

3. A method as recited in claim 2, wherein said receiving comprises receiving the request through one of a first type port configured for rich terminal services sessions or a second type port configured for limited terminal services sessions.

4. A method as recited in claim 2, in an event that corresponding permitted sessions are unavailable, negotiating to free an individual corresponding permitted session.

5. A method as recited in claim 2, wherein said authorizing comprises:
enabling the new terminal services session configuration;
determining if a permitted terminal services session corresponding to the given configuration is available; and,
disabling the new terminal services session if no corresponding configuration is available.

6. A method as recited in claim 2, wherein said authorizing comprises:
determining if a permitted terminal services session corresponding to the given configuration is available; and,
responsive to said determining, enabling the new terminal services session if a corresponding configuration is available.

7. A method as recited in claim 1, further comprising:
retrieving session type data from a licensing source, wherein the licensing source provides information relating to one or more restrictions associated with the requested session type and an authorized number of sessions for that session type.

8. A method as recited in claim 1, wherein the enforcement component is initialized responsive to detection of a first incoming connection.

9. A method as recited in claim 1 further comprising responsive to said monitoring, terminating the new terminal services session in an event that the new terminal services session configuration does not remain consistent with the corresponding session configuration of the corresponding TS license.

10. A computer-readable storage media comprising computer-executable instructions that, when executed, perform acts, comprising:

detecting, by a connection manager, an incoming connection from a client to establish a requested terminal services session, the incoming connection requesting one of a plurality of session types for the requested session, the plurality of session types comprising:
a rich terminal services session allowing the client to access a majority of available functions; and
a limited terminal services session allowing the client to access a minority of available functions;

communicating the incoming connection to a session manager to establish a new terminal services session corresponding to the requested terminal services session;

initializing a terminal services enforcement component, the enforcement component comprising an enforcement core enumerating a plurality of local sessions, the local sessions each having a permitted terminal services configuration according to a licensing policy and a corresponding session configuration according to a corresponding terminal services (TS) license and consistent with the permitted terminal services configuration, the corresponding session configuration related at least in part to the requested session type, wherein the licensing policy and TS license are created by the enforcement core;

binding the client to the new terminal services session according to agreed conditions between the client and the corresponding TS license communicated to the connection manager via the session manager;

establishing the new terminal services session having a session configuration consistent with the corresponding TS license, wherein the session manager associates the corresponding TS license to the new session and the enforcement component changes the state of the TS license to reflect the association;

monitoring the session configuration of the new terminal services session; and taking an action in an event that the session configuration of the new terminal services session diverges from the session configuration of the corresponding TS license.

11. The computer-readable storage media of claim 10, wherein the monitoring comprises monitoring what applications are accessible on the terminal services session.

12. The computer-readable storage media of claim 10, wherein the monitoring comprises:
ascertaining what applications are accessible on the terminal services session;
determining what applications are permitted on the terminal services session; and
comparing the accessible applications to the permitted applications.

13. The computer-readable storage media of claim 12, further comprising:
receiving a request for the new terminal services session having a given configuration through one of a first type port configured for rich terminal services sessions or a second type port configured for limited terminal services sessions;
authorizing the new terminal services session if a permitted terminal services session corresponding to the given configuration is available, wherein said authorizing comprises determining a total number of corresponding permitted sessions and whether any of the corresponding permitted sessions are available, in an event that corresponding permitted sessions are unavailable, negotiating to free an individual corresponding permitted session; and wherein the ascertaining is accomplished by a first component and wherein the first component is configured to generate a signal from time to time which indicates that the first component is functioning and further comprising terminating the terminal services session responsive to not receiving the signal for a predetermined period of time.

14. The computer-readable storage media of claim 10, wherein the taking an action comprises terminating the terminal services session.

15. A system comprising:

a server comprising one or more processors and a memory, the server communicatively coupled to one or more clients via a network, a terminal services component and a terminal services enforcement component;

the terminal services component comprising a connection manager and a session manager, wherein:

the connection manager is configured to detect an incoming connection from one or more clients to one of a plurality of ports and to communicate the incoming connection request to the session manager;

the session manager is configured to establish a new session responsive to the incoming connection, wherein the new session is configured according to a session type requested by the one or more clients of a plurality of session types and a corresponding session configuration according to a terminal services (TS) license, the corresponding session configuration related at least in part to the requested session type, wherein the new session is associated with the TS license, and the plurality of session types comprising:

a rich terminal services session allowing the one or more clients to access a majority of available functions; and a limited terminal services session allowing the one or more clients to access a minority of available functions;

the terminal services enforcement component comprising an enforcement core configured to ensure that the TS license issued for each corresponding session is consistent with a permitted session configuration according to a licensing policy; and the enforcement core terminating the terminal services session if the terminal services session deviates from the corresponding session configuration according to the TS license.

16. A system as recited in claim 15, the enforcement core comparing the established terminal services session configuration to available licensed terminal services session configurations to determine if the established terminal services session complies with an available individual licensed terminal services session configuration.

17. A system as recited in claim 16, further comprising a licensing source, wherein the enforcement component retrieves session type data from the licensing source.

18. A system as recited in claim 15, wherein the enforcement core is configured to ascertain applications accessible to the terminal services session based on the TS license.

19. A system as recited in claim 18, wherein the enforcement core is further configured to compare the accessible application to applications available in the permitted configuration.

20. A system as recited in claim 15, wherein the enforcement core is further configured to monitor applications accessible to the terminal services session, wherein the enforcement core is configured to terminate the terminal services session if the monitoring means does not communicate with the terminating means within a pre-established period of time.

\* \* \* \* \*